United States Patent [19]

Hazenbroek et al.

[11] Patent Number: 4,736,492
[45] Date of Patent: Apr. 12, 1988

[54] APPARATUS FOR BONING ANIMAL LEGS, LIKE THIGHS OF SLAUGHTERED CHICKENS

[75] Inventors: Jacobus F. Hazenbroek, AK Numansdorp; Aad Hobbel, Bt Strijen, both of Netherlands; William L. Wallbridge, Romsey, England

[73] Assignee: Systemate Holland B.V., Burgemeester de Zeeuwstraat, Netherlands

[21] Appl. No.: 862,684

[22] Filed: May 13, 1986

[30] Foreign Application Priority Data

May 13, 1985 [NL] Netherlands ............... 8501363

[51] Int. Cl.⁴ ............................................. A22C 21/00
[52] U.S. Cl. ................................. 17/46; 17/11; 17/1 G
[58] Field of Search .................... 17/11, 46, 56, 1 G

[56] References Cited

U.S. PATENT DOCUMENTS

| | | | |
|---|---|---|---|
| 2,897,536 | 8/1959 | Bergstrom et al. | 17/1 |
| 3,261,054 | 7/1966 | Kaplan et al. | 17/11 |
| 3,296,653 | 1/1967 | Segur | 17/11 |
| 3,348,261 | 10/1967 | Segur | 17/45 |
| 3,402,423 | 9/1968 | Helgeson et al. | 17/1 |
| 3,456,284 | 7/1969 | Wemer et al. | 17/1 |
| 3,533,128 | 10/1970 | Brown et al. | 17/1 |
| 3,672,000 | 6/1972 | Martin et al. | 17/11 |
| 3,866,271 | 2/1975 | McNeil | 17/1 |
| 3,965,535 | 6/1976 | Kaplan et al. | 17/1 G |
| 4,068,350 | 1/1978 | Van Appledorn | 17/1 |
| 4,213,229 | 7/1980 | Helmer et al. | 17/46 |
| 4,216,565 | 8/1980 | Volk et al. | 17/1 |
| 4,327,463 | 5/1982 | Martin | 17/11 |
| 4,377,884 | 3/1983 | Viscolosi | 17/11 |
| 4,402,112 | 9/1983 | Gasbarro | 17/11 |
| 4,446,600 | 5/1984 | Hooley et al. | 17/11 |
| 4,495,675 | 1/1985 | Hill | 17/1 |

Primary Examiner—Willie G. Abercrombie
Attorney, Agent, or Firm—Thomas & Kennedy

[57] ABSTRACT

Prepared parts of edible fowl, such as thighs of slaughtered chickens, are deboned by loading the parts in a plurality of pans (23) of a pan conveyor (22) with the lengths of the bones approximately parallel to one another extending across the direction of movement of the conveyor and moving the parts in series to a deboning station. Pusher (26) engages one end of the bone and urges each part along the length of the bone off its pan so that the other end of the bone engages centering cup (35) and is located in a predetermined position. Clamps (11 and 12) engage the other end of the bone and blades (19 and 20) also engage the other end of the bone, and the clamps pull the bone through the blades so that the blades remove the meat from the bone. The blades (19 and 20) and clamps (11 and 12) are mechanically connected to one driving means (15).

6 Claims, 12 Drawing Sheets

APPARATUS FOR BONING ANIMAL LEGS, LIKE THIGHS OF SLAUGHTERED CHICKENS

BACKGROUND OF THE INVENTION

The invention relates to an apparatus for removing animal bones from the meat surrounding the bone, with the bone having a joint at least at one end, like thighs of slaughtered chickens. The apparatus includes two blades rectilinearly movable towards and away from each other which can encircle the bone and a joint in order to incise the meat, two clamps movable towards and away from each other which also are mutually rectilinearly movable to and from the blades in a plane perpendicular to the blades in order to clamp a bone end and pull it through the blades, and driving means for the blades and clamps.

Such an apparatus generally is known from U.S. Pat. No. 4,495,675. The known apparatus comprises pneumatic driving means for the blades and clamps. This causes great difficulties as to adjusting the right motion times of the blades and the clamps and problems as to maintaining the motion times.

SUMMARY OF THE INVENTION

The present invention aims to improve on the above. According to the invention this is basically achieved in that the blades and clamps are mechanically connected to one rotary driving means. Furthermore a pan conveyor is mounted to the system which is also mechanically connected to the same rotary driving means, for carrying the animal parts one at a time to a deboning station, and a pusher is mounted adjacent the deboning station for pushing one animal part at a time to be deboned from the pan conveyor to a predetermined position between the clamps at every stroke.

In order to put the merit of the invention into practice, the driving means is connected to a curved disk having a curved groove in which a curved roll extends which is connected to a carrying bar of the clamps, said bar being reciprocable in a guideway.

On the carrying bar a clamp holder is mounted in which a shaft connected with two pairs of carrying plates for the clamps is reciprocatable against a spring, while a stop and a dual lever can have been applied for rotating the clamps with respect to the piston.

Furthermore the driving means through a transmission is connected to a sector disk that cooperates with the longer spread arm of a pantograph system for moving the blades towards and away from each other. A cam rotates with the sector disk to let the rear joint of the bone pass the blades.

Finally the driving means is connected through a coupling to a chain wheel of the pan conveyor.

The coupling mainly consists of a curved wheel that meshes only during a part of one rotation with a wheel disk.

In a completely mechanically operating variant of the present invention, the pusher is replaced by a loading arm which, through a bar structure and a curve roll, is drivable by a curve track being mounted on the upper side of the curve disk. Its curve track can comprise two rails with circular cross-section which are supported on the curved disk by bars.

The efficiency of such an apparatus can be further improved by a muscle stripper having vertical blades mounted between the pan conveyor and the blades and clamps, said muscle stripper being provided with a stripping arm bringing one bone to be stripped partly between the vertical blades at every stroke, and in that the vertical blades are pulled together by a spring and spaced apart by a cone, in which the motion of the cone is derived from the rotation of the dual lever.

The loading arm and the stripping arm are connected to the pertaining bar structure through a horizontal shaft and is provided with a stop in such a manner that the arms can slide over the pan conveyor, each bar structure also having means to compensate for the length variation of the bones.

Near the blades and clamps a foldable support plate can be mounted extending the bottom of the pans of the pan conveyor before the loading arm moves a bone to the clamps.

The blades preferably comprise adjustable dampers which can cooperate with stops which are foldable through a bar structure by a curve roll mounted on the shaft on which the sector disk is also mounted.

Furthermore a mechanical discharger can be mounted which is drivable through a bar structure being operated by a recess at the bottom of the curve disk.

Another object of this invention is to provide an improved apparatus and method for deboning poultry thighs and similar animal parts in which the clamps and blades that separate the meat and bone are mechanically driven.

Thus, it is an object of this invention to provide an improved deboning method and apparatus wherein poultry parts and similar animal parts can be deboned in an expedient and reliable way, minimizing the amount of labor required to achieve the desired deboning of the parts.

Another object of this invention is to provide a deboner which includes a conveyor for carrying a plurality of poultry thighs or similar parts in series to a deboning station and presenting one end of the part in a prescribed position where one end of the bone of the part can be located by the meat and bone separating apparatus.

Other objects, features and advantages of the invention will be understood by a review of the following specification, when taken in conjunction with the accompanying drawings.

BRIEF DESCRIPTION OF THE DRAWINGS

The invention will be further elucidated hereafter on the basis of the drawings, in which, as an example, an embodiment of an apparatus according to the invention is shown. In the drawing.

DETAILED DESCRIPTION

Figure 1:
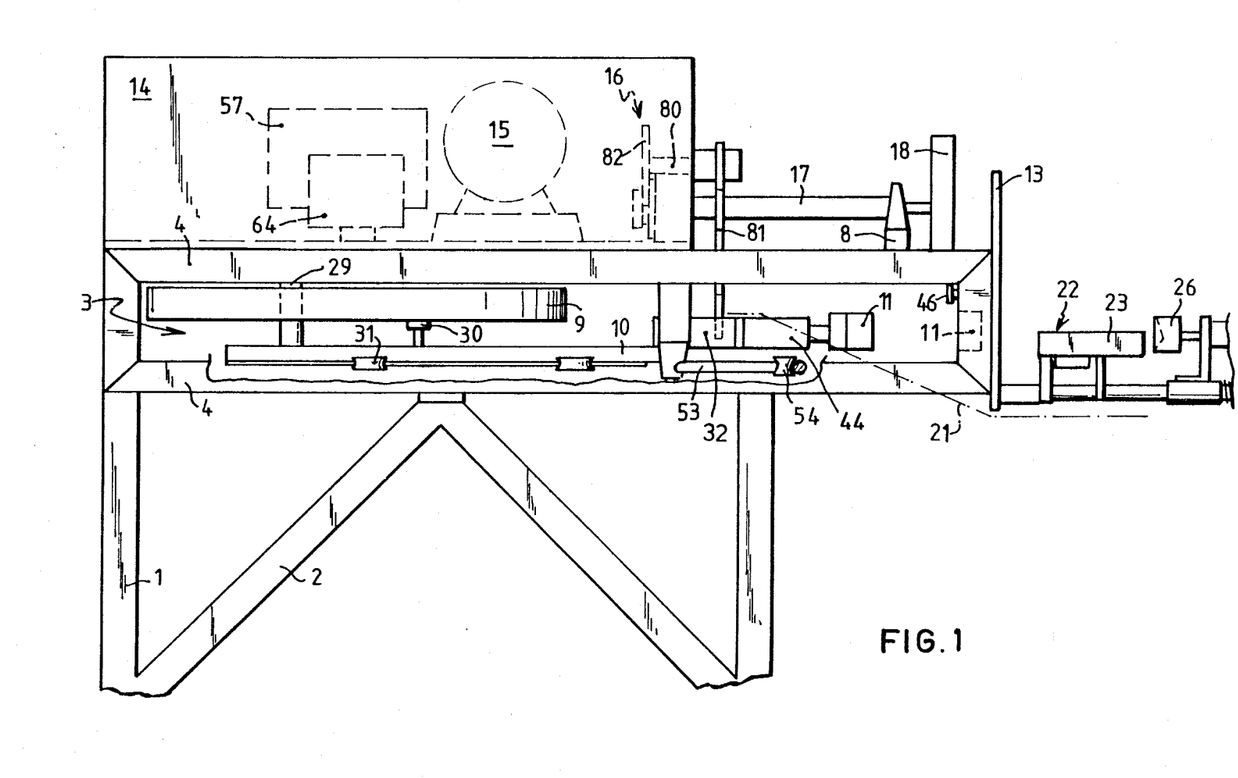
FIG. 1 shows a partially cross-sectioned and schematic side view of a thigh boning apparatus.
Figure 2:
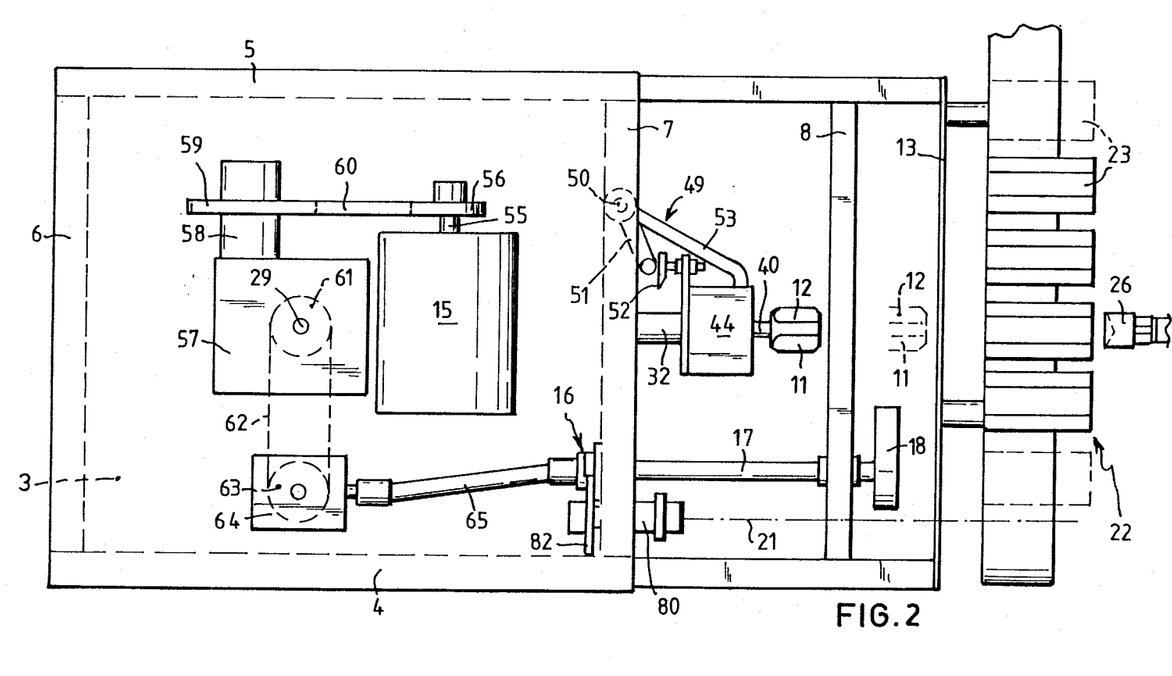
FIG. 2 shows a schematic top view of FIG. 1.

The apparatus shown in FIGS. 1 and 2 comprises a box 3 of longitudinal beams 4, 5 and transverse beams 6-8 being supported by legs 1 and struts 2. The box houses a curve disk 9 for reciprocating a carrying bar 10 of the clamps 11 and 12. These have been indicated by drawn lines in their most withdrawn position and by dotted lines in their position closest behind the blades 19 and 20 (FIG. 6-8) which have been mounted on a front plate 13 of the apparatus.

Over the box 3 between the transverse beams 6 a cover 14 is mounted in which a rotary driving means 15, e.g., an electro motor is positioned, as well as transmissions further to be explained and a coupling 6.

Figure 6:
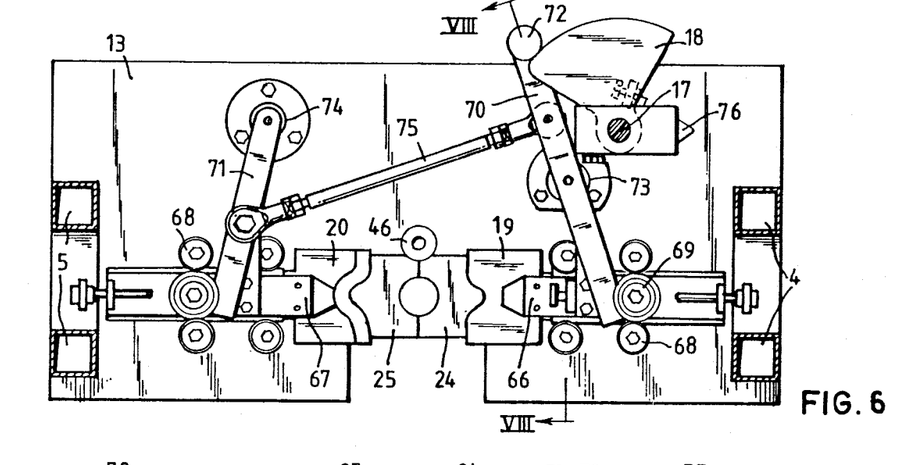
FIG. 6 shows a rear view of the pantograph system for moving the blades toward and away from each other.
Figure 7:
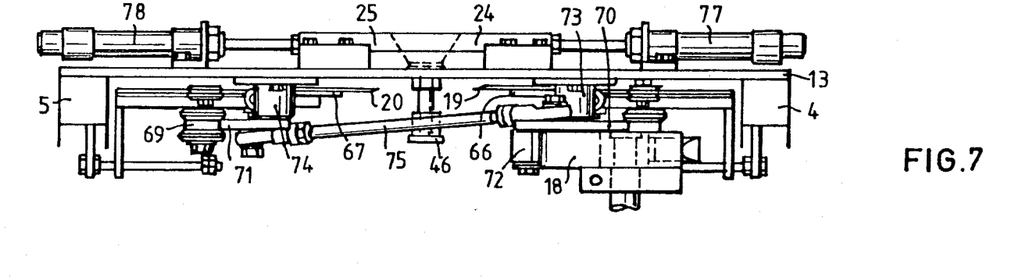
FIG. 7 shows a top view of FIG. 6.

Above the portion of the box 3 not covered by cover 14 a sector disk 18 mounted on the extremity of a shaft 17 is visible which is part of the control of the blades 19 and 20 not shown in FIGS. 1 and 2 (FIGS. 6 and 7).

The coupling 16 to be further elucidated serves for periodically driving, through a differential gear 21 indicated by strip-dotted lines, a pan conveyor 22 at the front of the apparatus, i.e., on the other side of the front plate 13.

The pan conveyor 22 has pans 23 having trough-shaped cross-sections, the dimensions of which are adjusted to the bones to be processed. Between the front plate 13 and the pans 23 there is space for the centering blocks 24 and 25 (FIGS. 6 and 7) not shown in FIGS. 1 and 2.

On the other side of the pan conveyor 22 a pusher 26 is mounted which can push a bone from a pan 23 brought into correct position by the pan conveyor into the opened clamps 11 and 12.

The portion above the box 3 between the front plate 13 and the cover 14 can be closed by a lid (not shown) being pivotably connected about a horizontal axis to the cover. Only the pan conveyor 22 and the pusher 26 remain visible during operation of the apparatus. The thighs to be boned have only to be placed into the pans 23 and the apparatus takes care of the rest of the operations fully automatically.

Figure 3:
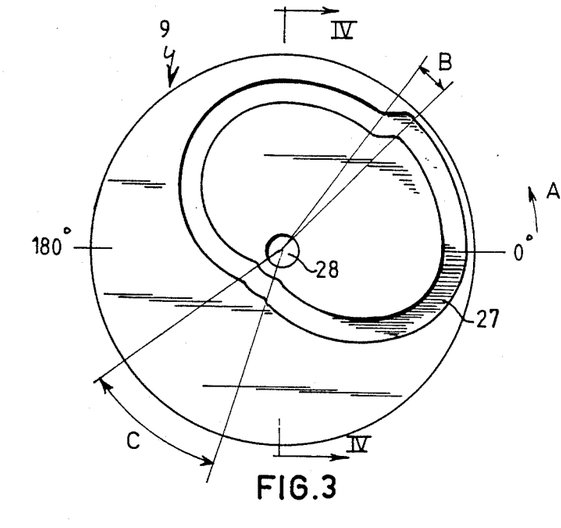
FIG. 3 shows a bottom view of the curve disk.
Figure 4:
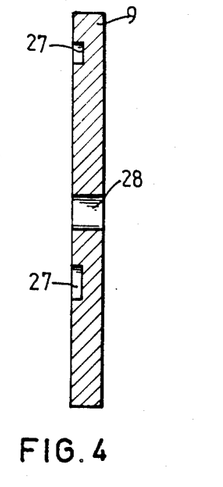
FIG. 4 shows a cross-section along line IV—IV of FIG. 3.

The curve disk 9 shown in FIGS. 3 and 4 has in its bottom plane a curve groove 27, a central bore 28 being fixedly connected to a shaft 29 (FIGS. 1 and 2) of the driving. The curve groove 27 cooperates with a curve roll 30 (FIG. 1) protruding upwards from the carrying bar 10 reciprocatable in the box 3 through pairs of rolls 31. At the free end of the carrying bar 10 a clamp means 32 is mounted, and thus the curve disk 9 serves to reciprocate the clamps 11 and 12.

Figure 9:
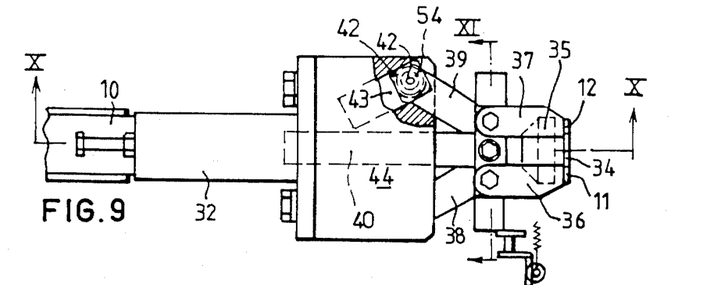
FIG. 9 shows a top view of the clamp means.
Figure 10:
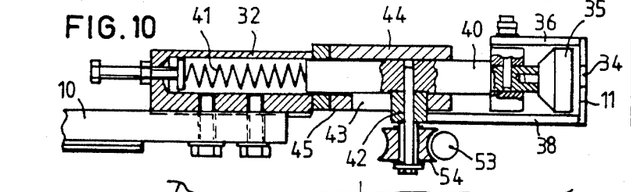
FIG. 10 shows a cross-section along line X—X of FIG. 9.
Figure 11:
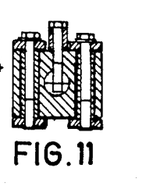
FIG. 11 shows a cross-section along line XI—XI of FIG. 9.

According to FIGS. 9 ans 10, the clamps 11 and 12 define in closed position a clamping hole 34 in which the bone past the one joint fits. Then said joint is pushed against a centering cup 35 by the pusher 26. The centering cup also defines a stop ensuring that the bone will not be pushed too far into the clamp, which would lead to loss of meat. To reach the centering cup the clamps 11 and 12 have to be open. This was established because each clamp is mounted on an upper short carrying plate 36, 37 and a lower short carrying plate 38, 39. These carrying plates 36-39 are rotatably connected to a shaft 40 being movable against spring 41 load in the clamp means 32. The extremities of the long carrying plates 39, 39 carry a sliding block 42 that can move through a groove 43 in the lowest of two guide plates 44, 45 situated in the extension of the clamp cylinder 32. The guide plates 44 and 45 can also be part of an integrally formed guide block for the clamp 11, 12.

If at a certain moment the upper short carrying plates 36 touch upon an adjustable stop 46 (FIG. 1) within the box 3, then the distance between the guide plates 44, 45 and the carrying plates 36-39 will decrease and then the clamps 11 and 12 open.

Returning to FIG. 3 and starting from position 0° in the direction of arrow A the following details of the curve groove 27 can be established:

up to section B the loading takes place, i.e., the operation of the pusher 26, in section B the closing of the clamps 11 and 12 takes place, just after section B, the blades 19, 20 slam together in a manner further to be elucidated, then the actual boning follows up to position 180°.

Now clamps 11 and 12 will have to be reopened to release the bone stripped of its meat. This is performed by the dual lever 49 visible in FIG. 2 which can rotate about a shaft 50 mounted on the transverse beam. When the short portion 51 of the lever 49 is pushed backwards by an adjustable stop 52 of the lever 49 is pushed backwards by an adjustable stop 52 of guide plate 44, a longer portion 53 naturally rotates also and then pushes against a roll 54 being mounted under one of the sliding blocks 42, so that the same effect is established as if the carrying plates touch upon the stop 46.

Returning again to FIG. 3, the following details can also be established:

between position 180° and section C the clamps 11 and 12 open, in section C the clamps remain open and the bone falls from the clamps, with which possibly a (not shown) discharging cylinder can be of assistance, after section C the carrying bar 10 with the clamps 11 and 12 moves forward again and the clamps are closed, and just before reaching position 0° the carrying plates touch upon stop 46 again and the clamps open.

Figure 5:
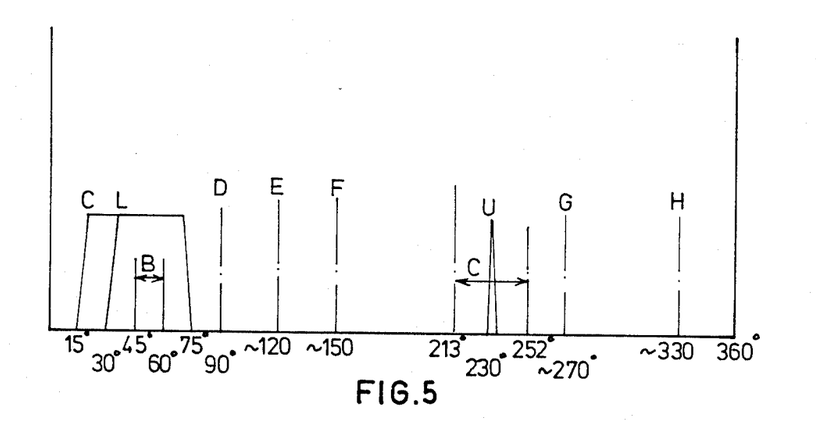
FIG. 5 shows a diagram for elucidating the various stages of boning with the apparatus according to the invention.

Sections B and C can also be found in the diagram of FIG. 5. Furthermore the relation between the motion of the clamps 11, 12 and the blades 19, 20 can be derived from it. There the remaining characters have the following meaning:

D=commence boning,
E=blades open slightly in order to let the rear joint through,
F=blades close behind the first joint,
G=blades begin to open, and
H=blades are completely open.

The mechanical driving of the blades 19 and 20 will now be elucidated on the basis of FIGS. 1, 2 and 6-8.

The outgoing shaft 55 (FIG. 2) of the motor 15 bears a small pulley 56. The shaft 29 bearing at its bottom end curve disk 9, is part of a worm wheel box 57 with an ingoing shaft 58 bearing a larger pulley 59. A belt 60 is placed about the pulleys 56 and 59.

At the top end of shaft 29 a chain wheel 61 is mounted, being connected through a chain 62 to a chain wheel 63 of a square gearbox 64 being connected through a universal joint 65 and the coupling 16 to the shaft 17 on which the sector disk 18 is mounted.

Figure 8:
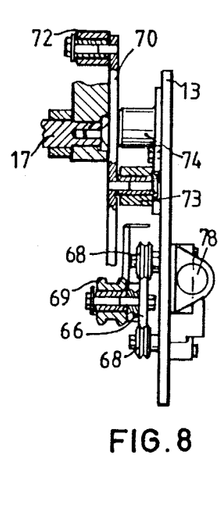
FIG. 8 shows a cross-section along line VIII—VIII of FIG. 6.

The blades 19 and 20 have facing cutting edges with an appearance being adjusted in the usual manner to that of the bones to be processed, and they are releasably connected to blade carriers 66, 67 being able to move rectilinearly towards and away from each other between pairs of upper and lower guiding rolls 68 protruding from the front plate 13. The blade carriers 66, 67 are loaded towards each other by a tension spring (not shown). Catching rolls 69 protrude from the blade carriers 66, 67, said rolls being able to cooperate with spread arms 70, 71.

The longer spread arm 70 bears at its top end a spreading roll 72 that can cooperate with the curve disk 18, (FIG. 2) and is about midlength rotatably supported in a bearing 73 mounted to the front plate 13.

The shorter spread arm 71 is at its top end rotatably supported in a bearing 74 mounted to the front plate 13.

Both spread arms 70 and 71 are connected to a couple bar 75 in such a way that if the sector disk 18 touches upon the roll 72, both blades 19 and 20 substantially cover the same track in the direction of opening.

If the sector disk 18 is disengaged from the spread roll 72, the tension spring (not shown) causes the blades to close again. Such a mechanism can be called a pantograph mechanism.

On the shaft 17 a cam 76 (FIG. 6) is also mounted which slightly opens to let through the rear joint of the bone (section R of FIG. 5).

At the front side of the front plate 13 in FIGS. 7 and 8 the air cylinders 77 and 78 are also visible operating the centering blocks 24 and 25, however, these are not included in the actual subject of the present invention: mechanically driving the clamps 11, 12, and blades 19, 20. The centering blocks have been mounted because most of the meat is found on the joint to be stuck in. This is then stripped, so that it is not lost. A method within the scope of the present invention to mechanically establish the above will be eludicated on the basis of FIG. 16.

However, there is still something suitable for mechanical driving, vis. the driving of the pan conveyor 22 and this driving will be elucidated on the basis of FIGS. 1, 2 and 12-15.

The differential gear 21 obviously only has to rotate part of one rotation with one rotation of the shafts 17 and 29 (FIG. 2). This is achieved with the coupling 16.

Figure 12:
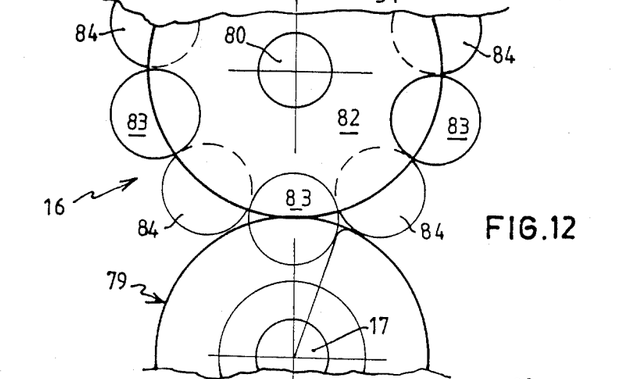
FIG. 12 shows a basic sketch of the coupling of the pan conveyor.
Figure 13:
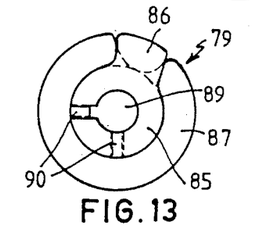
FIGS. 13-15 show three views of the curve wheel of the coupling of FIG. 12.
Figure 14:
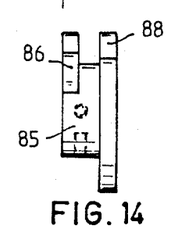
Figure 15:
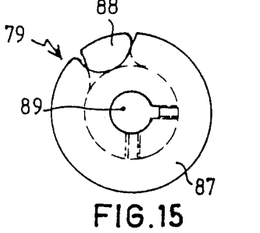

FIG. 12 shows the principle of coupling 16. On the continuously rotating shaft 17 for driving the sector disk 18 is a curve wheel 79. On the intermittingly rotating shaft 80 connected through a chain transmission 81 (FIG. 1) to the differential transmission 21 for driving the pan conveyor 22, is a wheel disk 82.

The wheel disk 82 carries on its one side five front wheels 83 spaced apart at regular angular distances along its periphery and on the other side five rear wheels 84 positioned exactly in between the front wheels.

The curve wheel 79 has a front portion 85 with a small diameter carrying a recess 88 which can come exactly between two front wheels and then turn the curve wheel 79 over one tenth of a revolution.

The curve wheel 79 has a rear portion 87 which larger diameter having a recess 88 which can mesh with a rear wheel 84. Consequently the protrusion 86 firstly pushes wheel 83 away, so that disk 82 can rotate. Wheel 84 then rotates into recess 88. Protrusion 86 rotates the wheel disk 82 over one-tenth of a revolution, whereupon surface A (FIG. 15) takes over and rotates the wheel disc still one-tenth revolution, so that it in fact rotates over one-fifth revolution.

After this rotation of disk 82, again two wheels 84 rotate against portion 87 so that disk 82 cannot rotate anymore.

The curve wheel 79 has a drilled-through bore 89 and a pair of securing holes 90 for securing it to the shaft 17.

Figure 16:
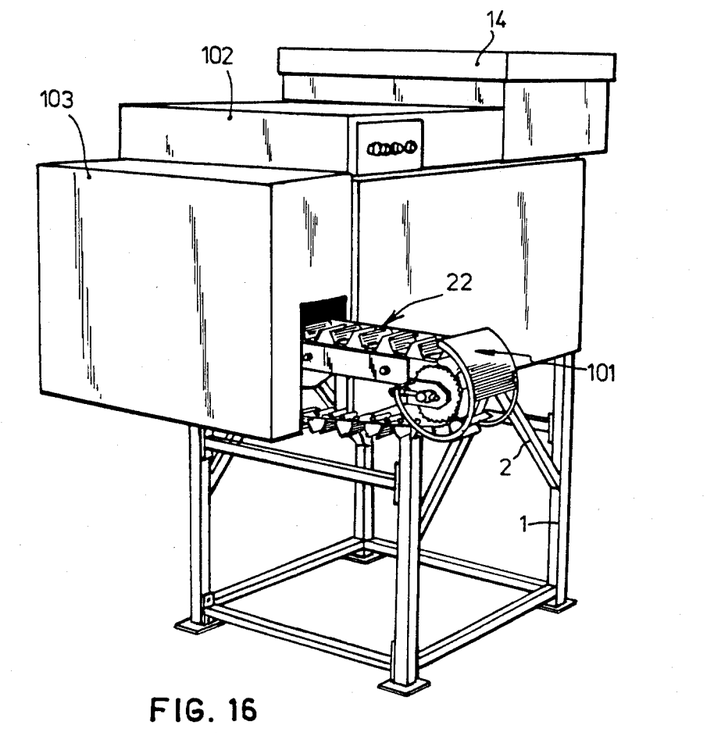
FIG. 16 shows in perspective a view of the final embodiment of the boner with muscle stripper, mechanically driven arms and other improvements.

FIG. 16 shows an apparatus in operation, i.e., that almost all the moving parts with the exception of the loading place of the pan covneyor 22 are obscured from observation by lids and covers. The curve of the pan conveyor is screened off by a curve screen 101 for security's sake.

Figure 17:
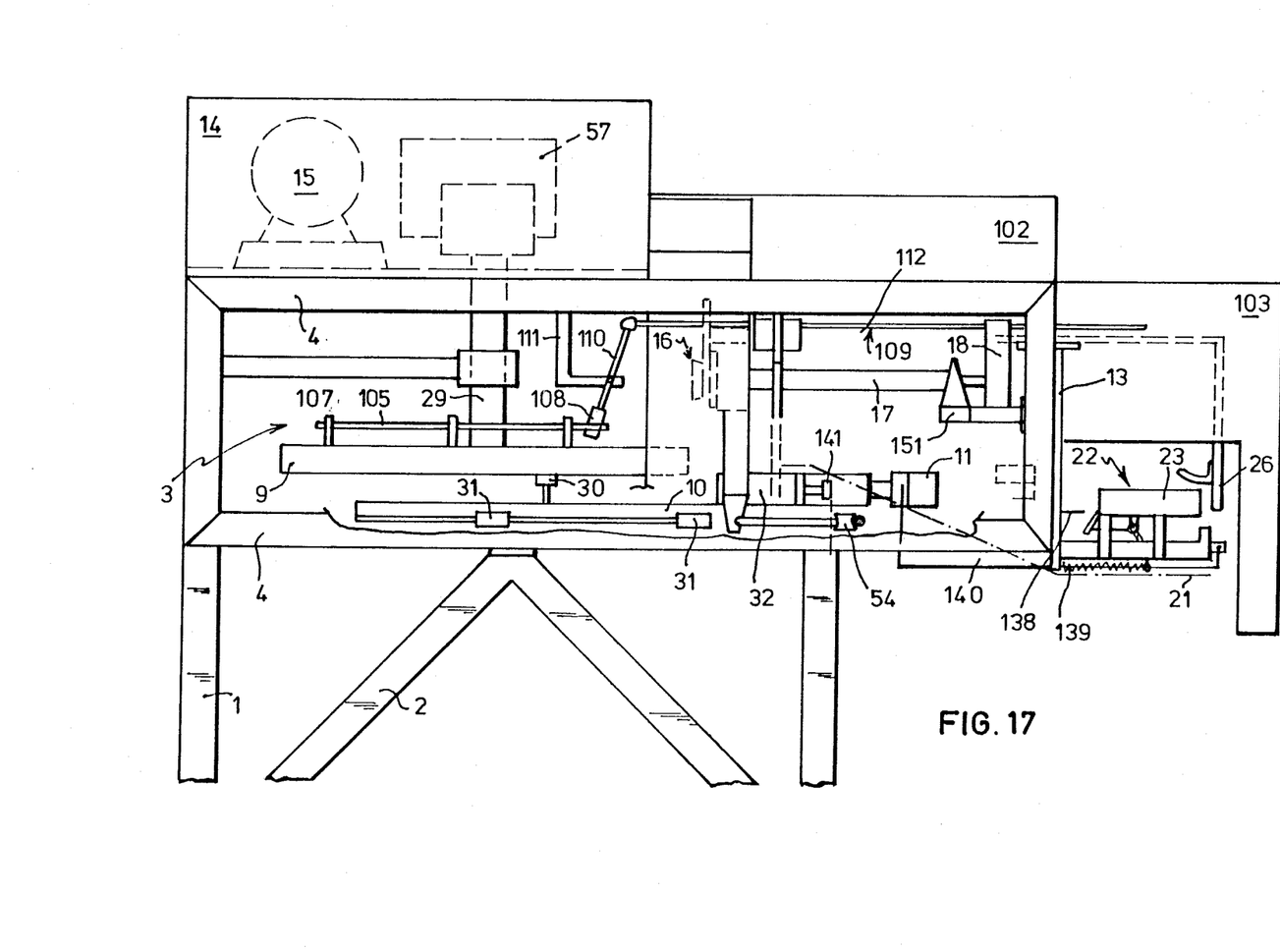
FIG. 17 shows a partially cross-sectioned and schematic side view of the thigh boning apparatus of FIG. 16.
Figure 18:
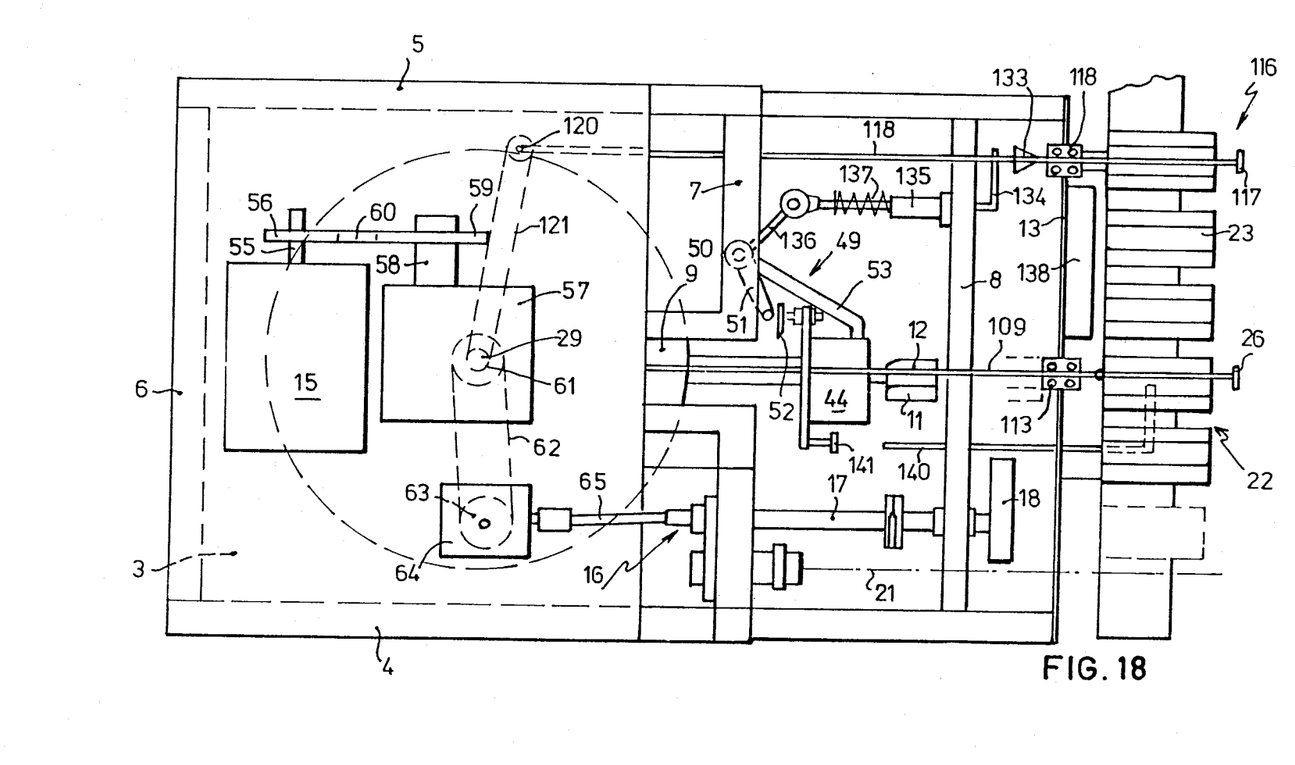
FIG. 18 shows a schematic top view in FIG. 17.

The apparatus shown in FIGS. 17 and 18 comprises a box 3 of longitudinal beams 4, 5 and transverse beams 6-8, being supported by legs 1 and struts 2 in which the transverse beam contrary to FIG. 2 interrupted for letting a bar structure still to be discussed, pass. The box houses a curve disk 9 for reciprocating a carrying bar 10 of the clamps 11 and 12. These have been indicated by drawn lines in their most withdrawn position and by dotted lines in their position closest behind the blades 19 and 20 (FIGS. 24 and 25) which have been mounted on a front plate 13 of the apparatus.

Over the box 3 between the transverse beams 6 and 7 a cover 14 is mounted in which a rotary driving means 15, e.g., an electro motor is positioned, as well as transmission further to be explained and a coupling 16.

Above the portion of the box 3 not covered by cover 14 a sector disk 18 mounted on the extremity of a shaft 17 is visible which is part of the control of the blades 19 and 20 (FIGS. 24 and 25) not shown in FIGS. 17 and 18.

The coupling 16 to be further elucidated serves for periodically driving, through a differential gear 21 indicated by stripe-dotted lines, a pan conveyor 22 at the front of the apparatus, i.e., on the other side of the front plate 13.

The pan conveyor 22 has pans 23 having trough-shaped cross-sections, the dimensions of which are adjusted to the bones to be processed.

On the outer side of the pan conveyor 22 loading arm 26 is mounted which can transfer a bone from a pan 23 brought into correct position by the pan conveyor into the opened clamps 11 and 12.

The portion above the box 3 between the front plate 13 and the cover 14 can be closed by a lid 102 connected to the cover 14; and the portion beyond the lid by a protective housing 103. The only thing remaining visible during operation of the apparatus is the pan conveyor 22. The thighs to be deboned have only to be placed into the pans 23 and the apparatus takes care of the rest of the operation fully automatically.

Figure 19:
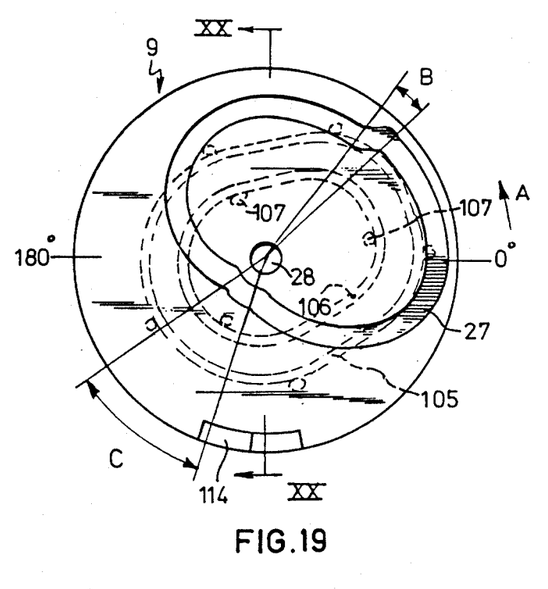
FIG. 19 shows a bottom view of the curve disk.
Figure 20:
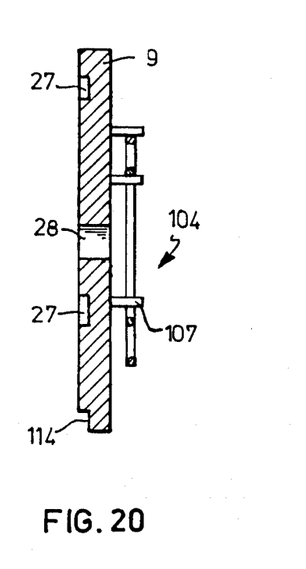
FIG. 20 shows a cross-section along XX of FIG. 19.

The curve disk shown in FIGS. 19 and 20 has in its bottom plane a curve groove 27, a central bore 28 being fixedly connected to a shaft 29 (FIGS. 17 and 18) of the driving. The curve groove 27 cooperates with a curve roll 30 (FIG. 17) protruding upwards from the carrying bar 10 reciprocatable in the box 3 through pairs of rolls 31. At the free end of the carrying bar 10 a clamp means 32 is mounted, and thus the curve disk 9 serves to reciprocate the clamps 11 and 12.

The curve disk 9 shown in FIGS. 19 and 20 has in its upper plane a curve track 104 comprising an outer rail 105 and an inner rail 106 each resting on the curve disk 9 by means of bars 107. Between the two rails runs a curve roll 108 (FIG. 17) being connected through a bar structure 109 to the pusher 26 which now is embodied as a loading arm. The bar 110 carrying the curve roll 108 is connected to the box 3 via a bracket 111 and the horizontal bar 112 reciprocates the loading arm 26 which is supported in a guide 113 (FIG. 18) on the front plate 13. On the basis of FIG. 21, the loading arm suspension will be explained in more detail.

You are reminded that the clamps 11 and 12 in FIGS. 9 and 10 in their closed position define a clamping hole 34 in which the bone fits past the big joint. Then said joint is pushed against the centering cup 35 by the loading arm 26, after the clamps 11 and 12 have been opened in the earlier-described manner.

Returning to FIG. 19, starting from the position 0° in the direction of arrow A the following details of the curve groove can be established:

up to section B the loading takes place, i.e., the operation of the loading arm 26, in section B the closing of the clamps 11 and 12 takes places, just after section B, the blades 19, 20 slam together in a manner further to be elucidated, then the actual boning follows up to position 180°.

Now clamps 11 and 12 will have to be reopened to release the bone stripped of its meat. This is performed by the dual lever 49 visible in FIG. 18 which can rotate about a shaft 50 mounted on the transverse beam 7. When the short portion 51 of the lever 49 is pushed backward by an adjustable stop 52 of clamp means 32, a longer portion 53 naturally rotates also and then pushes against a roll 54 (FIG. 17) being mounted under one of the sliding blocks 42.

Again returning to FIG. 19 the following details can also be established;

between position 180° and section C the clamps 11 and 12 open, in section C the clamps remain open and the bone falls from the clamps, with which possible a (not shown) discharger can be of assistance, which is operated through a bar structure and a roll by a recess 114 under the curve disk 9, after section C the carrying bar 10 with the clamps 11 and 12 moves forward again and the clamps are closed, and just before reaching position 0° the clamps open again.

The mechanical driving of the blades 19 and 20 will now be elucidated on the basis of FIGS. 17, 18, 24 and 25.

The outgoing shaft 55 (FIG. 18) of the motor 15 bears a small pulley 56. The shaft 29 bearing at its bottom end curve disk 9, is part of a worm wheel box 57 with an ingoing shaft 58 bearing a larger pulley 59. A belt 60 is placed about the pulleys 56 and 59.

At the top end of shaft 29 a chain wheel 61 is mounted being connected through a chain 62 to a chain wheel 63 of a square gearbox 64 being connected through a shaft 65 and the coupling 16 is connected to the shaft 17 on which the sector disk 18 is mounted.

Figures 24, 26:
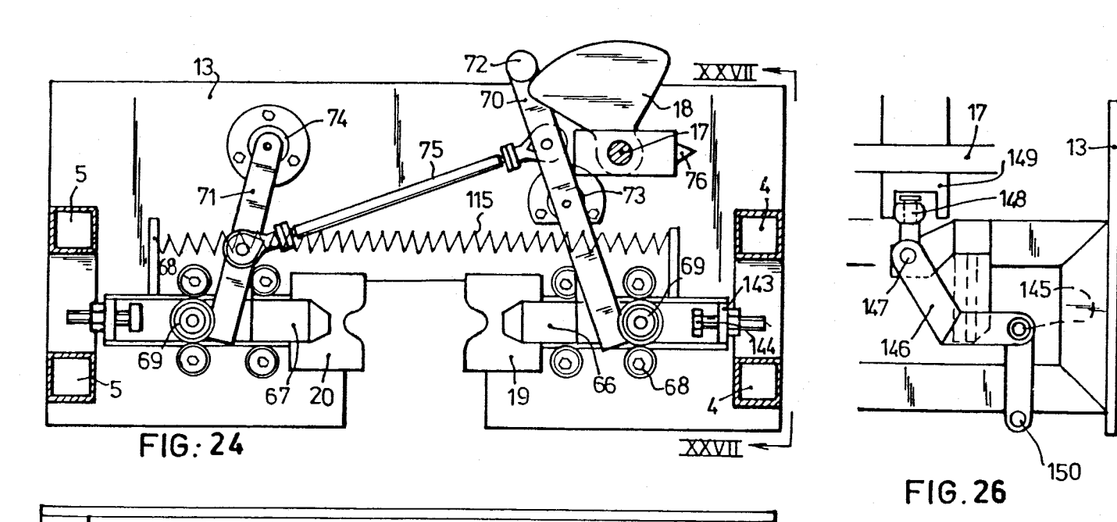
FIG. 24 shows a view as in FIG. 6.
FIG. 26 shows a schematic view along line XXVII—XXVII of FIG. 25.

The blades 19 and 20 have in FIG. 24 facing cutting edges with an appearance being adjusted in the usual manner to that of the bones to be processed, and they are releasably connected to blade carriers 66, 67 being able to move rectilinearly towards and away from each other between pairs of upper and lower guiding rolls 68 protruding from the front plate 13. The blade carriers 66, 67 are loaded towards each other by a tension spring 115. Catching rolls 69 protrude from the blade carriers 66, 67, said rolls being able to cooperate with spread arms 70, 71.

The longer spread arm 70 bears at its top end a spreading roll 72 that can cooperate with the curve disk 18, (FIG. 18) and is about midlength rotatably supported in a bearing 73 mounted to the front plate 13.

The shorter spread arm 71 is at 1st top end rotatably supported in a bearing 74 mounted to the front plate 13.

Both spread arms 70 and 71 are connected to a couple bar 75 in such a way that is the sector disk 18 touches upon the roll 72, both blades 19 and 20 substantially cover the same distance in the direction of opening. If the sector disk 18 is disengaged from the spread roll 72, the tension spring 115 causes the blades to close again. Such a mechanism can be called a pantographmechanism.

On the shaft 17 a cam 76 (FIG. 24) is also mounted which slightly opens the blades to let through the rear joint of the bone (see section E of FIG. 5).

The mechanical driving of the pan conveyor 22 is in this embodiment of the apparatus identical to what has been described on the basis of FIGS. 12-15.

An important difference between the two described embodiments is found in adding a so-called muscle stripper 116 and this will be elucidated on the basis of FIGS. 18 and 21-23. The function of the muscle stripper is to prevent the blades 19, 20 from cutting into the meat, which would decrease the efficiency of the apparatus with respect to the quotient of the weights of the removed to removable meat. However, this does entail that the tough knee cap mass which is not fit for human consumption remains also attached to the meat for the moment, but said mass can easily be removed by hand during the final check which is necessary anyway. An added advantage of applying the muscle stripper is that the clamps have better grip on a bone without meat than on a bone with meat.

The part in question is called a muscle stripper, because the tough knee cap mass is connected to the bone by a thick muscle and membrane.

The muscle stripper 116 comprises in FIG. 18 a stripping arm 117 having similarities with the loading arm 26 and which through a bar structure 118 is driven by a crank 120 itself being made to rotate by a chain 121 which is drive by a chain wheel being placed on the central shaft 29.

The bar structure 118 is supported on the front plate 13 by a guide 119 being identical to the guide 113 for the loading arm 26. The arms 26 and 117 and the guides 113 and 119 will be further discussed on the basis of FIG. 21, in which also one of the vertical blades 122 is visible which are driven in the manner which will be elucidated on the basis of FIG. 23.

Figure 21:
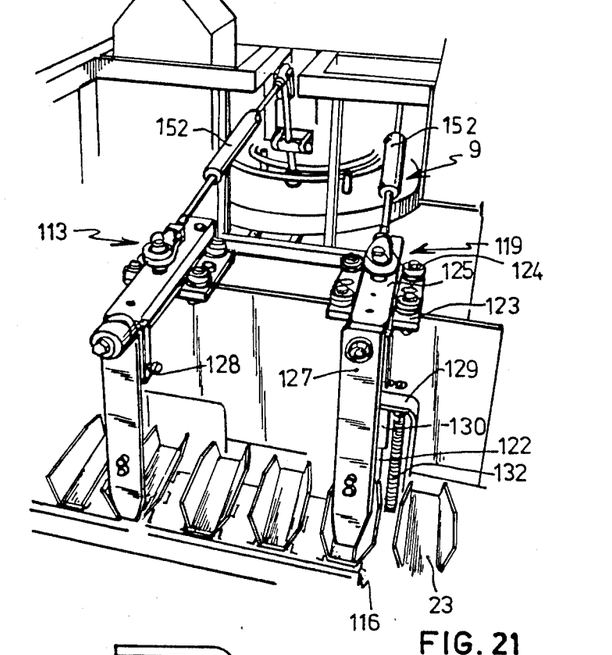
FIG. 21 shows in perspective a loading arm and stripping arm of the apparatus of FIG. 16.
Figure 22:
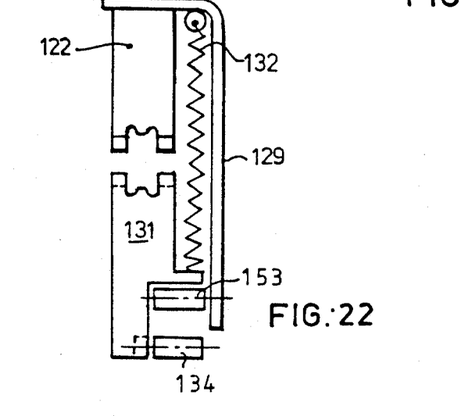
FIG. 22 shows in perspective the driving means of the vertical blades.

FIG. 21 shows also that the arms 26 and 117 each have a push plate 127 rotatable about a horizontal shaft 126. The correct position of the plates 127 is adjustable by an adjustable stop 128 being connected to the slide, and the plates are loaded by springs (not visible) according to the adjusted position. If a plate of an arm 26 or 117 would not have moved back sufficiently before the pan conveyor starts to move, then the plates 127 can rotate over the pans 23. Bar structures 109 and 118 also show a tubular thickening 152 which houses a spring which is adapted to compensate the length variations of the bones.

The upper blade 122 which is hard to see in FIG. 21 is connected to a how 129 better visible there. The upper blade 122 is guided on the front plate 13 between two welded-on angular strips 130 (only one of which is visible in FIG. 21) and this also holds good for a vertical lower blade 131. Both vertical blades 122 and 131 are pulled together by a spring 132 so as to determine the closed position of the blades. In said closed position the greater end of a bone is pushed between the specially formed eges of the blades 122 and 131 by the plate 127 of the muscle stripper 116. Subsequently the blades have to be opened to let the end of a bone lying in a pan 23 pass through in the direction of the plate 127 in front of the clamps 11, 12. Said opening of the vertical blades 122 and 131 is attained in the manner shown in FIGS. 18 and 22 by pushing a cone 133 between two pins 153, 154 being connected to the upper blade 122 and the lower blade 131 respectively. Said cone 133 is positioned at the end of a bar structure 134 which is lead into a sleeve 135 being connected to the transverse beam 8, and which is driven by an extra arm 136 connected to the shaft 50 and which causes the bar structure to move against a spring (137) load. Consequently the muscle stripper 116 pushes the joint through the vertical blades 122 and 131, so that the very thick muscle and the hard web and the meat with several affixtures are stripped off said joint. After this treatment the meat remains on the bone in a more backward position, so that the joint can effectively be gripped. The horizontal blades 19, 20 now close in front of the meat and thus don't cut into the meat.

Between the muscle stripper 116 and the horizontal blades 19, 20 the joints of the bones protrude from the pans 23 of the pan conveyor and in order to prevent the bones from rolling out, a horizontal support plate 138 (FIG. 18) is mounted in that section. For the horizontal blades 19, 20 themselves the distance between the pans 23 and the blades 19, 20 is covered by a foldable support plate (FIG. 17) which through a bar structure 140 is driven by a stop 141 on the guide plate 44 (FIG. 18). The foldable support plate 139 returns to its suspended position under the influence of a spring 142 (FIG. 17).

Figure 25:
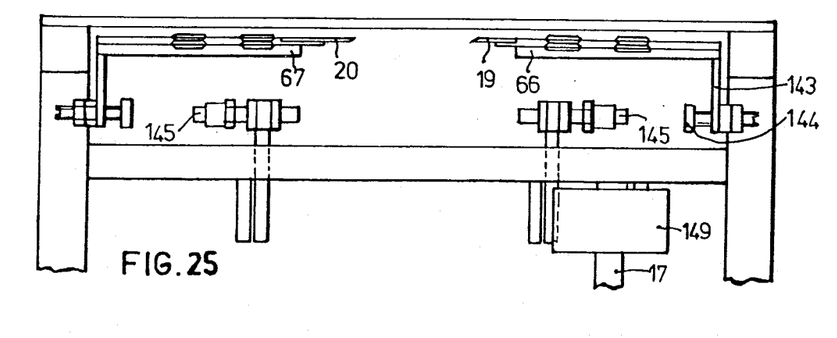
FIG. 25 shows a top view of FIG. 24.

Because the blades 19, 20 produce a lot of noise nusiance at closing and also sustain near on account of impact effect, a damp construction has been mounted which will be further elucidated on the basis of FIGS. 24-26.

Figure 23:
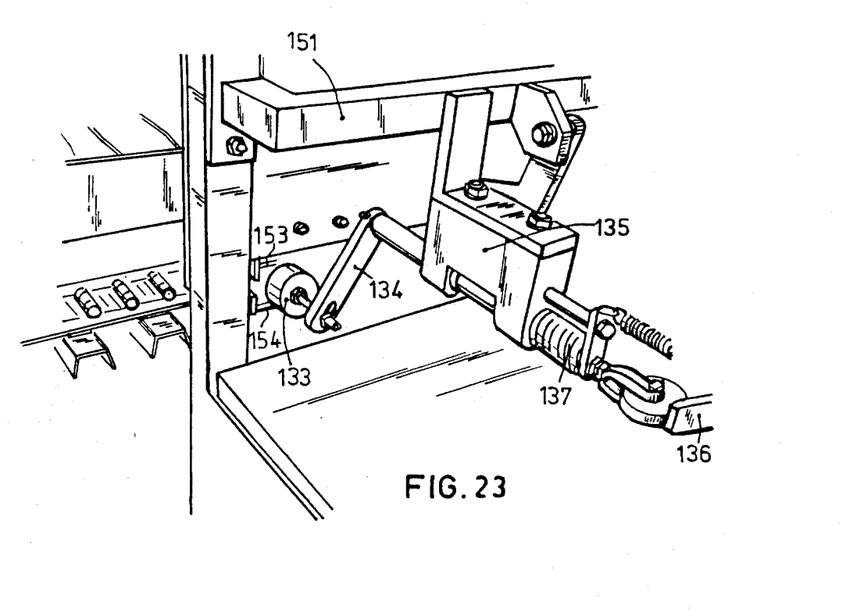
FIG. 23 shows blade opening structure.

The blade carriers 66, 67 are provided with supports 143 (FIG. 25) on which adjustable stops 144 are mounted. When closing the blades 19 and 20 the stops engage dampers 145 which are mounted on the levers 146 (FIG. 26) which can rotate about a shaft 147 connected to the box 3. One of the levers 146 is fixedly connected to a roll 148 running in a curve wheel 149 being mounted on the shaft 17 on which the sector disk 18 is also mounted. Both the levers have been integrated by a horizontal couple bar 150. After the dampers 145 and stops 144 have performed their duty, the dampers are folded away and the blades 19 and 20 touch upon the bone. The shaft 147 is supported on an extra transverse beam 151 which also supports the sleeve 135 (FIG. 23).

To make sure that no bone remains in the clamps 11, 12 after they have been opened, finally a mechanical discharger can be mounted which is operated by the recess 114 on the bottom side of the curve disk 9 (FIG. 19). For clarity's sake this discharger has not been included in the drawings.

Thus an entirely mechanically operating apparatus is obtained, which, if designed for boning things of poultry, can have a capacity of about 1250 bones per hour. Removing the thighs can take place on a conveyor belt (not shown).

Other embodiments than those shown in the drawings can also be within the scope of the present invention.

| LIST OF COMPONENTS | | | |
|---|---|---|---|
| 1 | Leg | 44, 45 | Guide Plate |
| 2 | Strut | 46 | Stop |
| 3 | Box | 47, 48 | Shaft |
| 4, 5 | Longitudinal Beam | 49 | Dual Lever |
| 6, 7, 8 | Transverse Beam | 50 | Shaft |
| 9 | Curve Disk | 51 | Short Portion |
| 10 | Carrying Bar | 52 | Adjustable Stop |
| 11, 12 | Clamp | 53 | Longer Portion |
| 13 | Front Plate | 54 | Roll |
| 14 | Cover | 55 | Outgoing Shaft |
| 15 | Motor | 56 | Small Pulley |
| 16 | Coupling | 57 | Worm Wheel Box |
| 17 | Shaft | 58 | Ingoing Shaft |
| 18 | Sector Disk | 59 | Larger Pulley |
| 19, 20 | Blade | 60 | Belt |
| 21 | Differential Gear | 61 | Chain Wheel |
| 22 | Pan Conveyor | 62 | Chain |
| 23 | Pan | 63 | Chain Wheel |
| 24, 25 | Centering Blocks | 64 | Perpendicular Gear Box |
| 26 | Pusher/Loading Arm | | |
| 27 | Curve Groove | 65 | Differential Gear |
| 28 | Central Bore | 66, 67 | Blade Carriers |
| 29 | Shaft | 68 | Guide Rollers |
| 30 | Curve Roll | 69 | Catching Rolls |
| 31 | Roll | 70, 71 | Spread Arms |
| 32 | Clamp Means | 72 | Spread Roll |
| 33 | Carrier Head | 73, 74 | Bearing |
| 34 | Clamping Hole | 75 | Couple Bar |
| 35 | Centering Cup | 76 | Cam |
| 36, 37 | Short Carrying Plate | 77, 78 | Air Cylinders |
| 38, 39 | Long Carrying Plate | 79 | Curve Wheel |
| 40 | Shaft | 80 | Shaft |
| 41 | Spring | 81 | Chain Transmission |
| 42 | Sliding Block | 82 | Wheel Disk |
| 43 | Groove | 83 | Front Wheels |
| 84 | Rear Wheels | 129 | Bow |
| 85 | Front Portion | 130 | Angular Strip |
| 86 | Protrusion | 131 | Lower Blade |
| 87 | Rear Portion | 132 | Spring |
| 88 | Recess | 133 | Cone |
| 89 | Bore | 134 | Bar Structure |
| 90 | Securing Hole | 135 | Sleeve |
| 101 | Curve Plate | 136 | Extra Arm |
| 102 | Lid | 137 | Spring |
| 103 | Protective Housing | 138 | Support Plate |
| 104 | Curve Track | 139 | Foldable Support Plate |
| 105 | Outer Rail | | |
| 106 | Inner Rail | 140 | Bar Structure |
| 107 | Bar | 141 | Stop |
| 108 | Curve Roll | 142 | Spring |
| 109 | Bar Structure | 143 | Support |

-continued

LIST OF COMPONENTS

| | | | |
|---|---|---|---|
| 110 | Bar | 144 | Stop |
| 111 | Bracket | 145 | Damper |
| 112 | Bar | 146 | Lever |
| 113 | Guide | 147 | Shaft |
| 114 | Recess | 148 | Roll |
| 115 | Tension Spring | 149 | Curve Wheel |
| 116 | Muscle Stripper | 150 | Couple Bar |
| 117 | Stripping Arm | 151 | Extra Transverse Bar |
| 118 | Bar Structure | | |
| 119 | Guide | 152 | Thickening |
| 120 | Crank | 153 | Pin |
| 121 | Chain | 154 | Pin |
| 122 | Blade | | |
| 123 | Plate | | |
| 124 | Roll | | |
| 125 | Slide | | |
| 126 | Horizontal Shaft | | |
| 127 | Plate | | |
| 128 | Stop | | |

We claim:

1. An apparatus for deboning animal parts having a bone with at least a joint at one end, like thighs of slaughtered chickens, comprising at least two blades each having cutting edges movable towards and away from each other with the cutting edges defining recesses which form a circular opening for receiving the bone of an animal part when the blades are moved toward each other in order to incise the meat, clamp means movable towards and away from the circular opening formed by the recesses of said blades in order to clamp onto a bone end incised by said blades and pulling the bone through the blades, conveyor means for the moving the animal parts in series with the bones of the animal parts extending transverse to the direction of movement toward a position of alignment of the bones with recesses of said blades, pusher means on one side of said blades for engaging one end of each bone and moving the animal part along the length of the bone into the recesses of the blades, whereby the animal parts are carried by the conveyor means in series to a position aligned with the blades, are pushed into the blades, the blades incise the bone and the bone is pulled through the blades and the movement of the meat with the bone is retarded by the blades.

2. An apparatus according to claim 1, characterized in that said conveyor means comprises a pan conveyor (22) and rotary driving means for driving said pan conveyor, said blades, said clamp means and said pusher in timed relationship with each other.

3. An apparatus according to claim 2, characterized in that said rotary driving means (15) is connected to a curved disk (9) having a curved groove (27) in which a curved roll (30) extends which is connected to a carrying bar (10) of the clamps, said bar being reciprocable in a guideway (31).

4. A method of deboning poultry thighs and similar edible bone and meat parts comprising the steps of:
arranging a plurality of parts with their bones approximately parallel to one another and moving the parts in spaced series to a deboning station,
when each part reaches the deboning station urging each part along the length of the bone until one end of the bone engages a bone-end centering means,
grasping the one end of the bone at the bone-end centering means and pulling the bone along its length, and
as the bone is pulled along its length engaging the part with a meat stripping means to retard the movement of the meat with the bone and strip the meat from the bone.

5. The method of claim 4 and wherein the step of moving a plurality of parts in spaced series to a deboning station comprises conveying the parts on a surface conveyor toward the deboning station with their bones extending across their direction of movement, and wherein the step of urging each part comprises pushing the other end of the bone so as to move the part in a direction extending along the length of the bone until the one end of the bone engages the bone-end centering means.

6. A method of deboning poultry thighs and similar edible bone and meat parts comprising the steps of:
placing a plurality of parts on a surface conveyor with the bones of each part extending transverse to the direction of movement of the surface conveyor and moving the poultry thighs in spaced series to a deboning station,
pushing on one end of the bone of the part in the deboning station to move the part along the length of the bone into a bone-end centering means,
grasping and pulling the other end of the bone of the part along the length of the bone,
as the bone is pulled along its length engaging the part with meat stripping means to retard the movement of the meat with the bone and to strip the meat from the bone.

* * * * *